(12) United States Patent
Goto et al.

(10) Patent No.: US 7,967,947 B2
(45) Date of Patent: *Jun. 28, 2011

(54) METHODS FOR BEATING PULP, METHODS FOR TREATING PROCESS WATERS, AND METHODS FOR PRODUCING PULP AND PAPER

(75) Inventors: Shisei Goto, Tokyo (JP); Hiromichi Tsuji, Tokyo (JP); Keigo Watanabe, Tokyo (JP); Takeshi Iimori, Tokyo (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 658 days.

This patent is subject to a terminal disclaimer.

(21) Appl. No.: 11/884,012

(22) PCT Filed: Feb. 9, 2006

(86) PCT No.: PCT/JP2006/302277
§ 371 (c)(1),
(2), (4) Date: Aug. 9, 2007

(87) PCT Pub. No.: WO2006/085598
PCT Pub. Date: Aug. 17, 2006

(65) Prior Publication Data
US 2008/0078518 A1   Apr. 3, 2008

(30) Foreign Application Priority Data

Feb. 9, 2005 (JP) ................... 2005-033668
Mar. 31, 2005 (JP) ................... 2005-101845

(51) Int. Cl.
*D21B 1/36* (2006.01)
*B02C 19/06* (2006.01)
(52) U.S. Cl. .................. 162/21; 241/5; 241/21; 162/52
(58) Field of Classification Search ............ 161/21; 162/21, 247, 261; 241/5, 21
See application file for complete search history.

(56) References Cited

U.S. PATENT DOCUMENTS
3,834,982 A * 9/1974 Solonitsyn et al. ............ 162/1
(Continued)

FOREIGN PATENT DOCUMENTS
JP   S54-125703   9/1979
(Continued)

OTHER PUBLICATIONS
Derwent Summary of SU 720085 A, 1980.*
(Continued)

*Primary Examiner* — Matthew J Daniels
*Assistant Examiner* — Anthony J Calandra
(74) *Attorney, Agent, or Firm* — Nixon & Vanderhye P.C.

(57) ABSTRACT

The first invention aims to provide a method for preparing stiffer bulky pulp at a freeness level comparable to that obtained by mechanical treatments to improve the bulkiness of product paper by searching for a method capable of adjusting freeness while suppressing damage to pulp fibers and internal fibrillation in a process for producing pulp. The second invention aims to strip contaminants deposited on pulp fibers and/or inorganic particles to reduce adhesion of the contaminants and decrease microorganisms in a treatment of process water containing long pulp fiber fractions used in a process for producing pulp and paper, thereby clarifying process water and thus preparing high-quality pulp and paper. According to the first invention, cavitation is generated in a pulp suspension preferably by a liquid jet and the resulting fine bubbles are introduced into the pulp suspension to adjust the pulp suspension to a desired freeness by means of the impact force induced by collapse of the fine bubbles in a process for producing pulp. According to the second invention, process water containing 50% by weight or less, based on total solids, of long pulp fiber fractions used in a process for producing pulp and/or paper is treated by cavitation generated by a liquid jet and then returned to the process for producing pulp and/or paper and reused.

6 Claims, 3 Drawing Sheets

U.S. PATENT DOCUMENTS 5,080,758 A * 1/1992 Horng .................... 162/130
2009/0065164 A1 3/2009 Goto et al.

FOREIGN PATENT DOCUMENTS

| JP | 03-199478 | | | 8/1991 |
|----|-----------|---|---|--------|
| JP | 06-057670 | | | 3/1994 |
| SU | 720085 | | | 3/1980 |
| SU | 720085 | A | * | 3/1980 |
| SU | 1659556 | A | * | 6/1991 |
| WO | 95/28521 | | | 10/1995 |
| WO | WO 98/15686 | | | 4/1998 |
| WO | 01/87471 A2 | | | 11/2001 |
| WO | 2005/012632 A1 | | | 2/2005 |
| WO | WO 2009/122986 | | | 10/2009 |

OTHER PUBLICATIONS

Smook, Handbook for Pulp and Paper Technologists, 1992, Angus Wilde Publications, 2nd edition, chapters 13 and 14.*
Derwent Summary of SU 1659556 A Fumbarev, 1992.*
Heald editor, Cameron Hydrualic Data, 2002, Flowserve, Nineteenth Edition, p. 31-33 and 102-105.*
Heald editor, Cameron Hydrualic Data, 2002, Flowserve, Nineteenth Edition, p. 2-8.*
International Search Report for PCT/JP2006/302277 mailed May 2, 2006.

* cited by examiner

Figure 2   Ink removal rate (Froth from factory B)

Figure 3

Figure 3   Ink removal rate (white water from factory B)

METHODS FOR BEATING PULP, METHODS FOR TREATING PROCESS WATERS, AND METHODS FOR PRODUCING PULP AND PAPER

This application is the U.S. national phase of International Application No. PCT/JP2006/302277, filed 9 Feb. 2006, which designated the U.S. and claims priority to Japanese Patent Application Nos. 2005-033668, filed 9 Feb. 2005, and 2005-101845, filed 31 Mar. 2005, the entire contents of each of which are hereby incorporated by reference.

TECHNICAL FIELD

The first invention relates to methods for beating pulp as well as making printing papers such as coated and uncoated papers made from the pulp prepared by said such methods. More specifically, it relates to methods for preparing bulky pulp by generating cavitation in a pulp suspension and actively introducing the resulting fine bubbles into the pulp suspension to adjust the pulp suspension to a desired freeness by means of the impact force induced by collapse of the fine bubbles while reducing damages such as fragmentation of pulp fibers in a process for producing pulp using kraft pulps or mechanical pulps made from softwood, hardwood or non-wood fibers, and recycled pulps made from printed waste papers such as newspapers, advertising leaflets, magazines, data recording papers, photocopies, computer printouts or mixtures of these printed matters such as waste magazine papers and office waste papers as well as mixtures thereof.

The second invention relates to methods for treating process water containing 50% by weight or less, based on total solids, of long pulp fiber fractions used in a process for producing pulp and paper. More specifically, it relates to methods for producing pulp and paper having higher quality by introducing cavitation bubbles generated by a liquid jet into process water and stripping contaminants deposited on pulp fibers and/or inorganic particles by means of the impact force induced by collapse of the bubbles to reduce adhesion and decrease microorganisms, thereby improving the quality of process water.

BACKGROUND ART

Background Art of the First Invention

In recent years, there have been growing demands for bulky and light paper for the purpose of resource saving or physical distribution cost reduction and addition of high values such as quality appearance or mass appearance. In the prior arts, various methods for improving bulk have been attempted. For example, the following methods have been proposed: (1) using crosslinked pulp (patent document 1, patent document 2), (2) mixing synthetic fibers into pulp (patent document 3), (3) filling inorganic materials between pulp fibers (patent document 4), (4) adding void-inducing foaming particles (patent document 5), (5) adding lightly beaten pulp fibers (patent document 6), (6) including a soft calendering process (patent document 7), (7) adding bulking chemicals (patent document 8), (8) mercerizing pulp (patent document 9), (9) enzymatically treating pulp (patent document 10), etc. However, these methods had disadvantages such as failure to recycle pulp; a significant decrease in paper strength or stiffness due to the inhibition of interfiber bonding; unavoidable cost increases due to the addition of different types of chemicals or fillers to pulp; inevitable fresh problems including increased foams or sizing loss during papermaking processes, etc.

Patent document 1: JPA No. Hei 4-185791.
Patent document 2: JPA No. Hei 4-202895.
Patent document 3: JPA No. Hei 3-269199.
Patent document 4: JPA No. Hei 3-124895.
Patent document 5: JPA No. Hei 5-230798.
Patent document 6: JPA No. Sho 58-24000.
Patent document 7: JPA No. Hei 4-370293.
Patent document 8: JPA No. Hei 11-350380.
Patent document 9: JPA No. Hei 7-189168.
Patent document 10: JPA No. Hei 7-54293.

Background Art of the Second Invention

In recent years, the deterioration of the quality of process waters has become a concern in processes for producing pulp and/or paper with a growing tendency to adopt a highly closed cycle system for the purpose of resource saving or global environmental conservation. The deterioration of the quality refers to an increase of contaminants and/or an increase of slime due to microbial growth or the like. Accumulation and circulation of these contaminants or slime in the system considerably influence runnability and product quality during the preparation of pulp and paper.

An approach to this lies in treating recycled water in a pressurized floatation tank or the like to partially remove contaminants and then returning it into the system, but this results in a decrease in yield, which is a significant drawback in processes for producing pulp and paper, because solids are non-selectively removed. Another approach lies in returning water into the system after it is subjected to a membrane treatment, but this is not practical because it incurs high process costs.

Especially, process waters in waste paper recycling processes are the most seriously polluted among processes for producing pulp and paper, and significantly influence total recycled water. The influence of process waters in waste paper recycling processes on the quality of pulp and paper is increasingly growing because the proportionate increase of recycled pulp in view of recycling.

Methods for recycling waste paper typically comprise the step of stripping ink from pulp fibers and the step of removing the stripped ink. More specifically, the mainstream method comprises promoting stripping of ink from pulp fibers and fragmentation thereof by hydrodynamic shear forces or the friction force between pulp fibers in a pulper under basic conditions by adding a surfactant in the presence of sodium hydroxide, sodium silicate and oxidizing bleaches and subsequently removing ink by flotation and/or washing.

When waste paper is to be more highly treated, an approach is adopted in which pulp is further treated using an equipment for promoting stripping/fragmentation of ink by mechanical force after the ink stripping step or ink removal step. Another approach further comprises an ink removal step consisting of flotation and/or washing subsequent to the ink stripping step.

Previously, rejects (called froth) generated by flotation or drain water (called white water) generated during the washing step has been mixed with pulp wastewater or papermaking wastewater and discharged in public water zones after appropriate treatments because they contain much ink and contaminants.

Alternatively, froth or white water has been returned into the system and reused to ensure water volume required to improve the yield or promote a closed-cycle process because it contains fibers and inorganic matters though contaminants including ink are deposited on the fibers and inorganic matters.

Thus, contaminants including ink circulate and accumulate in the system, thereby tending to deteriorate the quality of recycled water and possibly influencing the quality of the products.

When adhesive contaminants are included, they accumulate on machines to invite runnability loss such as web breaks or to form foreign objects on the products, which considerably deteriorate the appearance of the product.

In addition, it is predicted that deposits or sediments called slime will increase by microbial growth with increasing neutralization of paper in future. A solution to this is to use slime control agents for antimicrobial purposes, but this process incurs additional cost and requires a strategy against their environmental emission.

Thus, it was proposed to further treat froth or white water in a separator and then return it into the system, but it is difficult to selectively separate fibers and inorganic matters to which contaminants including ink are deposited because such a separator is designed to separate materials already dispersed.

In order to selectively separate contaminants including ink, it is preferable to separate them after they are stripped from fibers and ash to which they are deposited. Stripping equipments such as pulpers, kneaders, and dispersers are known and mainly used in waste paper recycling processes. However, all of them are effective at high consistency, and therefore ineffective for treating low-consistency waters such as froth or white water.

JPB HEI-7-18109 (patent document 1) proposes a deinking method using the shock induced by expansion/contraction of bubbles generated by ultrasonic waves applied into a vessel via a base plate of deinking equipment from an ultrasonic generator placed at the bottom of the base plate.

JPA 2004-19025 (patent document 2) proposes a method for stripping ink from froth or white water by applying ultrasonic waves using an ultrasonic transducer.

However, the effect intended by the present invention cannot be obtained by these methods because they generate cavitation with low efficiency due to the use of ultrasonic transducers in open systems and they work in a narrow range due to single frequencies.

JPA 2004-19025 (patent document 3) proposes to recycle froth or white water after ink components have been separated by a solvent treatment, but it entails safety problems because kerosene or n-hexane is used.

JPA 2004-263323 (patent document 4) proposes a method for improving the brightness of fibers and ash by deflaking froth generated by flotation of pulp obtained by disintegrating waste paper, but this approach is quite different from the present invention that allows low-consistency treatment.

Patent document 1: JPB No. Hei 7-18109.
Patent document 2: JPA No. 2004-19025.
Patent document 3: JPA No. 2004-19024.
Patent document 4: JPA No. 2004-263323.

DISCLOSURE OF THE INVENTION

Problems to be Solved by the Invention

Problems to be Solved by the First Invention

When pulp is beaten by conventional beaters such as double disc refiners, it generally undergoes changes such as a decrease in fiber length, an increase in microfibrils, an increase in curl, etc., with the decrease in freeness, and the resulting sheets show an increase in density.

Thus, the present invention aims to provide a method for preparing stiffer bulky pulp at a freeness level comparable to those obtained by mechanical treatments to improve the bulkiness of product paper by searching for a method capable of adjusting freeness while suppressing damage to pulp fibers and internal fibrillation in a process for producing pulp.

Problems to be Solved by the Second Invention

Thus, the present invention aims to strip contaminants deposited on pulp fibers and/or inorganic particles to reduce adhesion of the contaminants and decrease microorganisms in a treatment of process water containing long pulp fiber fractions in a process for producing pulp and paper, thereby clarifying the process water and thus preparing high-quality pulp and paper.

Means to Solve the Problems

Means According to the First Invention

Noting that pulp fibers' own bulk decreases most greatly during mechanical beating, we carefully studied a method for obtaining bulky pulp by selectively applying a load on the surfaces of pulp fibers to adjust freeness without decreasing the bulk of pulp fibers while suppressing damage to the fibers and internal fibrillation, and as a result, we achieved the present invention on the basis of the finding that freeness can be adjusted without affecting pulp fibers' own bulk by means of the impact force induced by collapse of fine bubbles generated by actively generating cavitation in a suspension of pulp fibers.

Thus, the present invention is characterized in that bulkier and stronger pulp can be obtained at a freeness comparable to those of pulp treated by conventional beating methods by actively introducing bubbles generated by cavitation into a suspension of pulp fibers to adjust the freeness of pulp, thereby promoting external fibrillation of pulp fibers by means of the impact force induced by collapse of the fine bubbles while suppressing internal fibrillation to adjust the freeness.

Accordingly, the present invention provides a method for preparing bulky pulp characterized in that pulp having a desired freeness is obtained by generating cavitation in a suspension containing pulp fibers in a process for producing pulp consisting of a pulping step and a blending step during which freeness is adjusted and additives such as fillers are added.

According to the present invention, cavitation can be generated by a fluid jet, and the pulp can be contacted with bubbles by emitting the pulp suspension itself as the fluid jet.

The fluid forming the jet can be any of liquids, gases and solids such as powder or pulp or a mixture thereof so far as it is in the fluid state. If necessary, the fluid can be combined with another fluid as a fresh fluid. The fluid and the fresh fluid may be jetted as a homogeneous mixture or separately jetted.

The liquid jet means a jet of a liquid or a fluid containing solid particles or a gas dispersed or mixed in a liquid, including a liquid jet containing slurry of pulp fibers, fibrous materials and inorganic particles, and bubbles. The gas here may include bubbles generated by cavitation, and may be separately added.

Pulp materials to be treated include kraft pulps or mechanical pulps made from softwood or hardwood or non-wood fibers or recycled pulps made from waste papers or cellulosic sheet-like materials, etc. Mixed materials of pulp with fibrous materials such as chemical fibers may also be treated.

When cavitation bubbles collapse, a high impact pressure reaching several GPas is generated in a local region on the order of several micrometers and the temperature rises to several thousand degrees Celsius, as described in a book of Katoh (New Edition Cavitation: Basics and Recent Advance, Written and Edited by Yoji Katoh, Published by Makishoten, 1999). As a result, cavitation has harmful influences such as damage, oscillation and performance loss on fluid machinery and this aspect has been recognized as a technical problem to be solved. In recent years, rapid advances in researches on cavitation have made it possible to precisely control the region in which cavitation occurs and even the impact force by using hydrodynamic parameters of cavitation jet as operation factors. As a result, expectations are arising for effective utilization of the strong energy of cavitation by controlling the impact force induced by collapse of bubbles. Thus, it has become possible to precisely control cavitation by operation/adjustment based on hydrodynamic parameters. This shows that stability of technical effects can be maintained, and the present invention is characterized by actively introducing bubbles generated by controlled cavitation into a pulp suspension to effectively utilize its energy rather than the conventional uncontrollably harmful cavitation spontaneously generated in fluid machinery.

The following Ukrainian papers (non-patent documents 1-3) describe that a waste paperboard stock or the like is beaten by cavitation using a pulp jet and obstacles having a rotating structure, thereby promoting internal fibrillation and improving tensile strength of fibers or the like. Thus, these techniques are applied to a different field and produce different effects from those of the present invention, and therefore, they are essentially different from the present invention, because the effects obtained by these techniques stem from the improvement in elongation due to softening of pulp fibers with the result that bulky pulp cannot be obtained by these techniques.

Non-patent document 1: R. A. Solo ⁄itsy ⁄ et al., Bum Prom-st', 1987 (6), 22.

Non-patent document 2: R. A. Solo ⁄itsy ⁄ et al., Bum Prom-st', 1987 (1), 25.

Non-patent document 3: R. A. Solo ⁄itsy ⁄ et al., Bum Prom-st', 1986 (7), 24.

Problems to be Solved by the Second Invention

As a result of careful studies, we found a method capable of clearing up the problems of stripping contaminants such as ink deposited on pulp fibers and/or ash, reducing adhesion and decreasing microorganisms by means of the impact force induced by collapse of fine bubbles by treating process water containing 50% by weight or less, based on total solids, of long pulp fiber fractions used in a process for producing pulp and paper by cavitation generated by a liquid jet.

Accordingly, the present invention provides a method for treating process water in a process for producing pulp and paper characterized in that cavitation bubbles are generated by a liquid jet and contacted with process water containing 50% by weight or less, based on total solids, of long pulp fiber fractions to strip contaminants deposited on pulp fibers and/or ash, reduce adhesion of the contaminants, and decrease microorganisms.

Advantages of the Invention

Advantages of the First Invention

By employing the method of producing pulp according to the present invention, stiffer bulky pulp can be obtained because the freeness of wood-based pulps such as kraft pulps and mechanical pulps as well as recycled pulps made from waste papers or cellulosic sheets can be adjusted while controlling damage to pulp fibers.

Advantages of the Second Invention

According to the present invention, contaminants including ink deposited on pulp fibers and/or ash can be stripped, adhesion of the contaminants can be reduced and microorganisms can be decreased by treating process water containing 50% by weight or less, based on total solids, of long pulp fiber fractions used in a process for producing pulp and/or paper, and moreover, contaminants such as ink can be more efficiently separated in a separator at a subsequent stage. Thus, high-quality process water can be obtained, and operation troubles or product defects due to contaminants can be reduced.

REFERENCES IN THE DRAWINGS

1: sample tank
2: nozzle
3: cavitation jet cell
4: plunger pump
5: upstream pressure regulating valve
6: downstream pressure regulating valve
7: upstream pressure meter
8: downstream pressure meter
9: water feed valve
10: circulating valve
11: drain valve
12: temperature sensor
13: mixer.

THE MOST PREFERRED EMBODIMENTS OF THE INVENTION

Embodiments of the First Invention

Pulps to be treated in the present invention are made from softwood or hardwood or non-wood fibers, or the like. More specifically, they include chemical pulps such as kraft pulps; mechanical pulps such as groundwood pulps, thermomechanical pulps and chemithermomechanical pulps; or recycled pulps made from waste papers or cellulosic sheet-like materials, etc. Waste papers to which the present invention can be applied include, e.g., newspapers, advertising leaflets, groundwood paper-based magazines, coated paper-based magazines, heat sensitive papers, pressure sensitive papers, simili papers, woodfree colored papers, photocopying papers, computer output papers or mixed waste papers thereof. Especially when the present invention is applied to kraft pulps (including recycled pulps prepared from waste papers based on kraft pulps), the resulting pulps have different properties from those of pulps obtained by conventional beating treatments. The present invention can also be applied to mixtures of pulp and high aspect ratio non-pulp fibrous materials such as chemical fibers.

For example, when the beating treatment according to the present invention is applied to kraft pulps, the decrease in water retention value with the decrease in the freeness of the pulp is milder than that observed with pulps subjected to conventional beating treatments. This phenomenon shows that external fibrillation of pulp fibers proceeded further than internal fibrillation by a cavitation treatment. Thus, bulkier and stronger paper sheets can be obtained as compared with pulps having equal freenesses obtained by conventional beating treatments.

When the beating treatment according to the present invention is applied to mechanical pulps, shives (bonded fibers) can be decreased as compared with pulps having equal freenesses obtained by mechanical treatments such as refiners. In other words, papermaking suitability can be improved because the freeness of pulp obtained by mechanical treatments can be increased so as to decrease shives.

According to the present invention, a pulp is beaten by a cavitation treatment to adjust it to a desired freeness. The freeness of the pulp having undergone the cavitation treatment varies according to the intended purpose and is not limited, but is approximately 200-600 ml Canadian Standard Freeness for hardwood kraft pulps, 200-600 ml Canadian Standard Freeness for softwood kraft pulps, 50-300 ml for mechanical pulps, and 50-400 ml for recycled pulps.

The cavitation treatment according to the present invention can be applied at any site in the pulping step and blending step, but preferably at the stage during which fibrous materials have been disintegrated into a pulp state.

Normally, pulp beating is performed by mechanical treatment. Specifically, the mechanical treatment refers to a treatment using an apparatus having a metal piece or a blade acting on pulp fibers around the axis of revolution such as a refiner, beater, PFI mill, kneader or disperser; or using friction between pulp fibers. Especially when a conventional beating treatment using a mechanical beater and a beating treatment using cavitation according to the present invention are combined, characteristics of pulp fibers are controlled and more desirable paper quality can be obtained because the beating treatments are performed by different mechanisms. If desired, sodium hydroxide, sodium silicate and other alkaline chemicals, deinking agents, oxidizing bleaches and reducing bleaches can also be added. If desired, dyes, fluorescent brightening agents, pH modifiers, antifoaming agents, pitch control agents, slime control agents or the like can also be added without problems. The beater or treatment conditions used are not specifically limited. The step of removing foreign substances or a bleaching step commonly used in the processes described above can also be included if it is necessary to remove foreign substances or to ensure high brightness.

Means for generating cavitation in the present invention include, but not limited to, using a liquid jet, an ultrasonic transducer, a combination of an ultrasonic transducer and a horn amplifier, and laser irradiation. Preferably, a liquid jet is used and it is more effective for pulp fibers because cavitation bubbles are efficiently generated and cavitation bubble clouds having a stronger impact force of collapse are formed. The cavitation generated by the methods described above is clearly different from the uncontrollably harmful cavitation spontaneously generated in conventional fluid machinery.

When cavitation is generated by a liquid jet in the present invention, the pulp suspension and bubbles can be contacted by emitting the pulp suspension as the liquid jet. A fluid jet can be a liquid jet, and the contaminant can be ink. The fluid forming the jet can be any of liquids, gases and solids such as powder or pulp or a mixture thereof so far as it is in the fluid state. If necessary, the fluid can be combined with another fluid as a fresh fluid. The fluid and the fresh fluid may be jetted as a homogeneous mixture or separately jetted (the description in this paragraph also applies to the second invention).

The liquid jet means a jet of a liquid or a fluid containing solid particles or a gas dispersed or mixed in a liquid, including a liquid jet containing pulp, a slurry of inorganic particles and bubbles. The gas here may include bubbles generated by cavitation (the description in this paragraph also applies to the second invention).

In cavitation, the flow rate and pressure are especially important because it occurs when a liquid is accelerated and a local pressure becomes lower than the vapor pressure of the liquid. Therefore, the basic dimensionless number expressing a cavitation state, Cavitation Number σ is defined as follows (New Edition Cavitation: Basics and Recent Advance, Written and Edited by Yoji Katoh, Published by Makishoten, 1999).

$$\sigma = \frac{p_\infty - p_v}{\frac{1}{2}\rho U_\infty^2} \quad (1)$$

where $p_\infty$: pressure of normal flow, $U_\infty$: flow rate of normal flow, $p_v$: vapor pressure of fluid, $\rho$: density of fluid.

If the cavitation number here is high, it means that the flow site is under a condition hard to generate cavitation. Especially when cavitation is generated through a nozzle or an orifice tube as in the case of a cavitation jet, the cavitation number σ can be rewritten by the following equation (2) where $p_1$: nozzle upstream pressure, $p_2$: nozzle downstream pressure, $p_v$: saturated vapor pressure of sample water, and the cavitation number σ can be approximated as shown in the following equation (2) in the case of a cavitation jet because of the large pressure difference between $p_1$, $p_2$ and $p_v$ resulting in $p_1 \gg p_2 \gg p_v$ (H. Soyama, J. Soc. Mat. Sci. Japan, 47 (4), 381 1998).

$$\sigma = \frac{p_2 - p_v}{p_1 - p_2} \cong \frac{p_2}{p_1} \quad (2)$$

Cavitation conditions in the present invention are as follow: the cavitation number σ defined above is desirably 0.001 or more and 0.5 or less, preferably 0.003 or more and 0.2 or less, especially 0.01 or more and 0.1 or less. If the cavitation number σ is less than 0.001, little benefit is attained because of the small pressure difference between cavitation bubbles and the surroundings when the bubbles collapse, but if it is greater than 0.5, cavitation is less likely to occur because of the small pressure difference in the flow.

When a jetting liquid is emitted via a nozzle or an orifice tube to generate cavitation, the pressure of the jetting liquid (upstream pressure) is desirably 0.01 MPa or more and 30 MPa or less, preferably 0.7 MPa or more and 15 MPa or less, especially 2 MPa or more and 10 MPa or less. If the upstream pressure is less than 0.01 MPa, little benefit is attained because of the small pressure difference between upstream pressure and downstream pressure. If it is greater than 30 MPa, cost disadvantages occur because special pumps and pressure vessels are required and energy consumption increases. On the other hand, the pressure in the vessel (downstream pressure) is preferably 0.05 MPa or more and 0.3 MPa or less expressed in static pressure. The ratio between the pressure in the vessel and the pressure of the jetting liquid is preferably in the range of 0.001-0.5.

The jet flow rate of the jetting liquid is desirably in the range of 1 m/sec or more and 200 m/sec or less, preferably in the range of 20 m/sec or more and 100 m/sec or less. If the jet flow rate is less than 1 m/sec, little benefit is attained because the pressure drop is too small to generate cavitation. If it is greater than 200 m/sec, however, cost disadvantages occur because high pressure is required and therefore, special equipment is required.

The site where cavitation is generated in the present invention can be selected from, but not limited to, the inside of a vessel such as a tank or the inside of a pipe. The treatment can be a one-pass operation, but the effect can be further enhanced by repeating a necessary number of runs. The treatment can be performed in parallel or in series using multiple generating means.

Jetting for generating cavitation may take place in a vessel open to the atmosphere such as a pulper, but preferably within a pressure vessel for controlling cavitation.

In the method for generating cavitation by a liquid jet in the present invention, the liquids that can be jetted to the pulp suspension include, but are not limited to, tap water, recycled water recovered during papermaking processes, pulp drain water, white water, and the pulp suspension itself. Preferably, the pulp suspension itself is jetted to provide a greater benefit because not only cavitation is generated around the jet but also a hydrodynamic shear force is obtained when a jet is emitted from a nozzle or an orifice at a high pressure.

The solids content of the target pulp suspension in which cavitation is to be generated by jetting a liquid is preferably 5% by weight or less, more preferably 4% by weight or less, still more preferably 0.1-3% by weight in terms of the bubble generating efficiency. When the solids content of the target liquid is 5% by weight or more and 20% by weight or less, a benefit can be attained by adjusting the consistency of the jetting liquid to 4% by weight or less.

The pH of the pulp suspension is preferably 1-13, more preferably 3-12, still more preferably 4-11. If the pH is less than 1, problems such as corrosion of equipment occur, which are disadvantageous in terms of materials and maintenance or the like. If the pH exceeds 13, however, alkaline discoloration of pulp fibers occurs to unfavorably lower brightness. Basic conditions are desirable because pulp fibers are highly swollen and more OH active radicals are produced.

According to the present invention, the flow rate of the jetting liquid increases by increasing the jetting pressure of the liquid, resulting in a pressure drop and generation of stronger cavitation. Moreover, the vessel receiving the target liquid is pressurized to increase the pressure in the region where cavitation bubbles collapse, resulting in an increase in the pressure difference between bubbles and the surroundings, whereby bubbles vigorously collapse with a stronger impact force. Cavitation is influenced by the amount of gas in the liquid, and if the gas is excessive, bubbles collide with each other and join together to create a cushioning effect so that the impact force of collapse is absorbed by other bubbles and the impact force decreases. Thus, the treating temperature is preferably 0° C. or more and 70° C. or less, especially 10° C. or more and 60° C. or less in view of the influence of dissolved gas and vapor pressure. Considering that the impact force is normally maximal at the midpoint between the melting point and the boiling point, temperatures around 50° C. are preferred in the case of aqueous solutions, though high effects can be obtained so far as the temperature is within the range described above because there is no influence of vapor pressure even at lower temperatures.

According to the present invention, the energy required for generating cavitation can be reduced by adding a surfactant. Surfactants that are used include, but are not limited to, known or novel surfactants, e.g., nonionic surfactants, anionic surfactants, cationic surfactants and ampholytic surfactants such as fatty acid salts, higher alkyl sulfates, alkyl benzene sulfonates, higher alcohols, alkyl phenols, alkylene oxide adducts of fatty acids, etc. These may be added as single components or mixtures of two or more components. The amount to be added may be any amount necessary for lowering the surface tension of the jetting liquid and/or target liquid.

The pulp prepared through the process described above contains stiff fibers with little damage so that it is bulky and can be used to prepare bulky paper.

Embodiments of the Second Invention

Process water to be treated in the present invention refers to service water used or produced in a process for producing pulp and/or paper and normally containing 5% by weight or less of solids and 50% by weight or less, based on total solids, of long pulp fiber fractions. The long pulp fiber fractions here refer to pulp fibers retained on a 150-mesh ($\phi$100 μm) screen.

Process waters of the present invention specifically include, but are not limited to, white water, service water, industrial grade water, recycled water, industrial water, washed water from washers, drain water from drainage systems (e.g., DNT washers, extractors, screw presses, etc.), froth or rejects from floatation tanks, scums and accepts from pressurized floatation equipments, shower water, wash water of felt or the like, diluted water of raw materials produced or used in a process for producing pulp and/or paper, or these waters having undergone a separation treatment such as floatation, foam separation, sedimentation separation, membrane separation, centrifugation, flocculation separation, etc.

As used herein, the pulp fibers refer to cellulose fibers of chemical pulp or mechanical pulp or waste paper pulp. Chemical fibers or glass fibers or the like may also be included. The inorganic particles refer to materials remaining as ash after incineration of paper, such as pigments internally added during papermaking or contained in coating layers. Specifically, they include, but are not limited to, calcium carbonate, talc, kaolin, titanium dioxide, etc.

As used herein, the contaminants refer to foreign substances deposited on pulp fibers and/or inorganic particles, including e.g., coated layer residues such as inks, fluorescent dyes or common dyes, coating colors, starches and synthetic resins; processed layer residues such as laminates; adhesives and self-adhesives, sizing agents, etc. Other examples include, but are not limited to, papermaking internal additives used during papermaking such as yield improvers, freeness improvers, paper strength enhancers and internal sizing agents.

In the present invention, solids and bubbles can be contacted with each other by emitting process water itself as a liquid jet when cavitation is generated by the liquid jet.

When cavitation is generated by jetting a liquid, the solids content of the target process water is preferably 0.01% by weight or more and 5% by weight or less, more preferably 0.1% by weight or more and 3% by weight or less in terms of the bubble generating efficiency. When the solids content of the target liquid is 5% by weight or more and 20% by weight or less, a benefit can be attained by adjusting the consistency of the jetting liquid to 5% by weight or less. The pH of the pulp suspension is desirably basic because more OH active radicals are produced.

MECHANISMS

Mechanism of the First Invention

The reason why internal fibrillation of pulp fibers is suppressed and external fibrillation is promoted in the present invention may be explained as follows. When fine bubbles generated by cavitation collapse, a strong energy is produced at a local region on the order of several micrometers, as described above. Thus, when fine bubbles or bubble clouds collapse at or near pulp fiber surfaces, the impact force arrives at the pulp fiber surfaces directly or via liquid and becomes absorbed into an amorphous region of cellulose forming pulp fibers, thereby promoting external fibrillation and swelling of pulp fibers. The bubbles are very small relative to pulp fibers so that the impact force is not so strong as to damage all of the pulp fibers. Moreover, pulp fibers absorb excessive energy as kinetic energy of the fibers per se even if a very strong impact force is induced by continuous collapse of bubble clouds because they are dispersed in liquid but not fixed. Thus, it is thought that the methods of the present invention can reduce damages such as fragmentation of pulp fibers and suppress internal fibrillation as compared with beating methods based on mechanical action.

Mechanism of the Second Invention

The reason why contaminants including ink deposited on pulp fibers are stripped in the present invention may be explained as follows. When fine bubbles generated by cavitation collapse, a strong energy is produced at a local region on the order of several micrometers, as described above. Thus, when fine bubbles or bubble clouds collapse at or near pulp fiber surfaces, the impact force arrives at the pulp fiber surfaces directly or via liquid and becomes absorbed into an amorphous region of cellulose forming pulp fibers, thereby promoting external fibrillation and swelling of pulp fibers and at the same time stripping contaminants such as ink.

The reason why the adhesion of contaminants decreases may be explained by the fact that hydroxy radicals are produced when fine bubbles generated by cavitation collapse and the produced hydroxy radicals act on the surfaces of adhesive contaminants to hydrophilize them.

The reason why microorganisms decrease may be explained by the fact that microbial cells are destroyed by the strong impact force as described above.

EXAMPLES

Examples of the First Invention

The following examples further illustrate the present invention without, however, limiting the invention thereto.

Examples 1-4

A commercially available bleached hardwood kraft pulp sheet was disintegrated in a low consistency pulper to prepare raw material A (freeness 666 ml CSF). Raw material A was adjusted to a desired consistency, and then treated in a cavitation jet washer (nozzle diameter 1.5 mm) shown in FIG. 1 at a jetting liquid pressure (upstream pressure) of 7 MPa (jet flow rate 70 m/sec.) and a pressure in the target vessel (downstream pressure) of 0.3 MPa for varying periods to modulate the freeness. A pulp suspension having a consistency of 1.1% by weight was used as a jetting liquid to treat the pulp suspension (consistency 1.1% by weight) in the vessel by cavitation. The treated pulp was tested for water retention value, screen analysis, and Canadian Standard Freeness (CSF), and the results are shown in Table 1.

Water retention value: determined according to J. TAPPI No. 26.
Screen analysis: determined according to JIS P 8207: 1976.
Canadian Standard Freeness (CSF): determined according to JIS P 8121: 1995.

Then, five handsheets were prepared from the treated pulp according to JIS P 8209. The handsheets were measured for thickness and basis weight by the methods described below and their density and bulk were calculated therefrom. The handsheets were further tested for breaking length and tensile breaking elongation, tear index, burst index, brightness and hue, opacity, specific scattering coefficient, and specific absorption coefficient by the methods described below. The results are shown in Tables 2-3.

Thickness: measured according to JIS P 8118: 1998.
Basis weight: measured according to JIS P 8124: 1998 (ISO 536: 1995).
Density and bulk: calculated from the measured value of the thickness and basis weight of each handsheet.
Breaking length and tensile breaking elongation: measured according to JIS P 8113: 1998.
Tear index: measured according to JIS P 8116: 2000.
Burst index: measured according to JIS P 8112: 1994.
Brightness and hue: measured by a calorimeter (from Murakami Color Research Laboratory Co., Ltd.) according to JIS P 8148.
Opacity: measured according to JIS P 8149: 2000.
Specific scattering coefficient, specific absorption coefficient: measured by a colorimeter (from Murakami Color Research Laboratory Co., Ltd.) according to TAPPI T425om-91.

Comparative Examples 1-5

Raw material A was beaten at a consistency of 10% and a clearance of 0.2 mm in a PFI mill for varying numbers of counts to modulate the freeness. The beaten pulp was tested for water retention value, screen analysis, and Canadian Standard Freeness, and the results are shown in Table 1. Then, handsheets were prepared in the same manner as described in Example 1 and tested for similar items, and the results are shown in Table 2-3.

TABLE 1

|  |  | Treatment conditions | CSF (ml) | Water retention (%) | Retained 42-mesh (%) | Retained 80-mesh (%) | Retained 150-mesh (%) | Pass 150-mesh (%) |
|---|---|---|---|---|---|---|---|---|
| Examples | 1 | 2 min | 580 | 118.5 | 62.2 | 17.3 | 7.1 | 13.3 |
|  | 2 | 5 min | 546 | 124.1 | 61.8 | 16.7 | 7.1 | 14.5 |
|  | 3 | 10 min | 500 | 126.2 | 61.6 | 17.1 | 7.1 | 14.3 |
|  | 4 | 15 min | 457 | 132.0 | 61.5 | 16.7 | 7.0 | 14.8 |

TABLE 1-continued

|  |  | Treatment conditions | CSF (ml) | Water retention (%) | Retained 42-mesh (%) | Retained 80-mesh (%) | Retained 150-mesh (%) | Pass 150-mesh (%) |
|---|---|---|---|---|---|---|---|---|
| Comparative examples | 1 | Untreated | 666 | 107.0 | 63.2 | 16.7 | 6.2 | 14.0 |
|  | 2 | 3000 counts | 478 | 149.1 | 62.7 | 16.1 | 6.5 | 14.7 |
|  | 3 | 5000 counts | 423 | 149.9 | 61.7 | 16.3 | 6.7 | 15.4 |
|  | 4 | 7000 counts | 360 | 159.8 | 61.7 | 16.4 | 6.5 | 15.4 |
|  | 5 | 10000 counts | 320 | 168.9 | 60.6 | 17.1 | 6.7 | 15.5 |

TABLE 2

|  |  | Basis weight (g/m$^2$) | Paper thickness (μm) | Density (g/m$^3$) | Bulk (cm$^3$/g) | Breaking length (km) | Elongation (%) | Tear index (mN·m$^2$/g) | Burst index (kPa·m$^2$/g) |
|---|---|---|---|---|---|---|---|---|---|
| Examples | 1 | 57.9 | 108.6 | 0.53 | 1.88 | 3.15 | 1.55 | 3.86 | 1.46 |
|  | 2 | 56.1 | 104.3 | 0.54 | 1.86 | 3.68 | 1.65 | 5.33 | 1.90 |
|  | 3 | 56.6 | 99.0 | 0.57 | 1.75 | 4.23 | 2.03 | 6.14 | 2.18 |
|  | 4 | 56.5 | 99.1 | 0.57 | 1.75 | 4.46 | 2.78 | 6.56 | 2.20 |
| Comparative examples | 1 | 55.5 | 110.1 | 0.50 | 1.98 | 2.30 | 1.05 | 3.69 | 1.03 |
|  | 2 | 55.8 | 91.9 | 0.61 | 1.65 | 5.40 | 3.32 | 7.35 | 3.06 |
|  | 3 | 56.5 | 89.4 | 0.63 | 1.58 | 6.15 | 3.78 | 7.34 | 3.97 |
|  | 4 | 56.3 | 88.9 | 0.63 | 1.58 | 6.21 | 3.98 | 7.93 | 3.97 |
|  | 5 | 55.9 | 85.1 | 0.66 | 1.52 | 7.00 | 4.37 | 8.14 | 4.28 |

TABLE 3

|  |  | Brightness (%) | Opacity (%) | Specific scattering coefficient (m$^2$/kg) | Specific absorption coefficient (m$^2$/kg) |
|---|---|---|---|---|---|
| Examples | 1 | 75.1 | 78.0 | 41.0 | 0.28 |
|  | 2 | 74.3 | 77.2 | 40.3 | 0.29 |
|  | 3 | 74.0 | 76.6 | 38.5 | 0.31 |
|  | 4 | 73.8 | 76.2 | 37.9 | 0.30 |
| Comparative examples | 1 | 75.0 | 78.1 | 42.8 | 0.29 |
|  | 2 | 72.4 | 74.1 | 34.4 | 0.31 |
|  | 3 | 72.0 | 73.6 | 32.7 | 0.32 |
|  | 4 | 71.5 | 72.2 | 31.0 | 0.31 |
|  | 5 | 70.7 | 72.0 | 28.9 | 0.45 |

As shown in Table 1, the water retention values decreased in the examples as compared with comparative examples at approximately equal freenesses. Water retention values can be used as indicators of internal fibrillation, and the decreased water retention values at equal freenesses suggest that external fibrillation has proceeded. No difference was observed in screened fiber composition because of the short fiber length of hardwood kraft pulp.

As shown in Table 2, the examples showed a smaller increase in density and improvements in breaking length, tear index and burst index as compared with the untreated control (Comparative example 1). Comparative examples 2-5 obtained by mechanical beating could improve in paper strength but their densities considerably increased.

As shown in Table 3, Example 4 showed relatively higher brightness and opacity than those of Comparative example 2 at approximately equal freenesses.

Thus, it can be said that the present invention provides a method for beating pulp wherein the bulk loss leading to a pulp freeness loss is reduced by promoting external fibrillation.

Examples 5-8

Raw material B consisting of thermomechanical pulp of *Pinus radiata* having undergone secondary refining by a practical factory machine (freeness 288 ml CSF) was treated in a cavitation jet washer in the same manner as described in Example 1 at a jetting liquid pressure (upstream pressure) of 7 MPa (jet flow rate 70 m/sec.) and a pressure in the target vessel (downstream pressure) of 0.3 MPa for varying periods to modulate the freeness. The resulting pulp was tested for water retention value, screen analysis and Canadian Standard Freeness and the results are shown in Table 4. Then, handsheets were prepared in the same manner as described in Example 1 and tested for similar items, and the results are shown in Tables 5 and 6.

Comparative Examples 6-10

Raw material B was beaten in a PFI mill in the same manner as described in Comparative example 1 for varying numbers of counts to modulate the freeness. The beaten pulp and handsheets prepared therefrom were tested for similar items to those of Example 5, and the results are shown in Tables 4, 5 and 6.

TABLE 4

|  |  | Treatment conditions | CSF (ml) | Water retention (%) | Retained 24-mesh (%) | Retained 42-mesh (%) | Retained 80-mesh (%) | Retained 150-mesh (%) | Pass 150-mesh (%) |
|---|---|---|---|---|---|---|---|---|---|
| Examples | 5 | 2 min | 227 | 98.4 | 32.6 | 17.9 | 13.7 | 7.8 | 28.0 |
|  | 6 | 5 min | 208 | 94.5 | 31.8 | 18.2 | 13.6 | 7.9 | 28.6 |
|  | 7 | 10 min | 180 | 94.9 | 30.5 | 18.9 | 14.2 | 7.9 | 28.5 |
|  | 8 | 15 min | 156 | 97.4 | 30.7 | 19.0 | 13.9 | 8.0 | 28.4 |

TABLE 4-continued

|  |  | Treatment conditions | CSF (ml) | Water retention (%) | Retained 24-mesh (%) | Retained 42-mesh (%) | Retained 80-mesh (%) | Retained 150-mesh (%) | Pass 150-mesh (%) |
|---|---|---|---|---|---|---|---|---|---|
| Comparative examples | 6 | Untreated | 288 | 100.0 | 31.4 | 17.1 | 16.6 | 7.7 | 27.2 |
|  | 7 | 1000 counts | 220 | 10.1.1 | 31.1 | 18.7 | 14.3 | 8.3 | 27.7 |
|  | 8 | 2000 counts | 198 | 99.3 | 26.8 | 20.4 | 15.3 | 9.0 | 28.6 |
|  | 9 | 3000 counts | 177 | 97.7 | 22.7 | 21.5 | 16.0 | 9.7 | 30.1 |
|  | 10 | 5000 counts | 150 | 100.3 | 16.5 | 23.4 | 17.4 | 11.0 | 31.6 |

TABLE 5

|  |  | Basis weight (g/m$^2$) | Paper thickness (μm) | Density (g/m$^3$) | Bulk (cm$^3$/g) | Breaking length (km) | Elongation (%) | Tear index (mN·m$^2$/g) |
|---|---|---|---|---|---|---|---|---|
| Examples | 5 | 58.8 | 175.2 | 0.335 | 2.98 | 2.7 | 1.5 | 1.6 |
|  | 6 | 57.9 | 173.9 | 0.333 | 3.00 | 2.8 | 1.4 | 1.5 |
|  | 7 | 56.7 | 175.3 | 0.323 | 3.09 | 2.6 | 1.2 | 1.6 |
|  | 8 | 58.6 | 177.1 | 0.331 | 3.02 | 2.8 | 1.5 | 1.5 |
| Comparative examples | 6 | 59.0 | 200.9 | 0.294 | 3.41 | 2.0 | 1.3 | 1.6 |
|  | 7 | 58.4 | 182.3 | 0.320 | 3.12 | 2.6 | 1.6 | 1.6 |
|  | 8 | 58.0 | 179.0 | 0.324 | 3.09 | 2.7 | 1.2 | 1.4 |
|  | 9 | 56.5 | 165.3 | 0.342 | 2.92 | 2.7 | 1.3 | 1.2 |
|  | 10 | 55.9 | 145.5 | 0.384 | 2.60 | 3.2 | 1.3 | 1.1 |

TABLE 6

|  |  | Brightness (%) | Opacity (%) | Specific scattering coefficient (m$^2$/kg) | Specific absorption coefficient (m$^2$/kg) |
|---|---|---|---|---|---|
| Examples | 5 | 49.7 | 92.5 | 40.4 | 3.7 |
|  | 6 | 49.9 | 92.5 | 41.1 | 3.8 |
|  | 7 | 49.7 | 92.6 | 41.9 | 4.0 |
|  | 8 | 49.4 | 93.6 | 42.4 | 4.2 |
| Comparative examples | 6 | 50.7 | 92.2 | 40.6 | 3.5 |
|  | 7 | 50.1 | 91.9 | 39.7 | 3.6 |
|  | 8 | 49.9 | 91.7 | 39.4 | 3.5 |
|  | 9 | 49.4 | 91.0 | 38.3 | 3.6 |
|  | 10 | 49.1 | 90.5 | 37.5 | 3.6 |

As shown in Table 4, the examples showed only slight changes in screened fiber composition when the freeness of untreated pulp (Comparative example 6) was lowered by cavitation. However, Comparative examples 7-10 showed a significant decrease in the proportion of long fibers retained on a 24-mesh screen by PFI mill treatment, and an increase in the proportion of shorter fibers. PFI mills are generally known to cut fibers less frequently than practical beaters, and therefore, it seemed that the freeness can be controlled by preventing fragmentation of fibers in the examples. It should be noted that the water retention value was less influenced because lignin remains in mechanical pulp.

As shown in Table 5, the examples showed little increase in density caused by freeness loss and maintained their bulks. However, the density increased and the bulk decreased with the decrease in freeness in the comparative examples. Moreover, the tear index decreased with the decrease in freeness in the comparative examples, indicating that they were influenced by the fragmentation of fibers.

As shown in Table 6, opacity, specific scattering coefficient and specific absorption coefficient increased in the examples as compared with the comparative example though they have approximately the same brightness. In the comparative examples, opacity and specific scattering coefficient decreased with the decrease in freeness, indicating that they were influenced by the increase in the density of paper.

Thus, it can be said that the present invention provides a method for beating pulp wherein bulk loss is reduced and freeness is controlled while damages such as fragmentation of fibers are reduced.

Examples 9-11

To a waste paper mixture consisting of waste newspaper, waste advertising leaflets, waste coated magazine paper and waste groundwood magazine paper in a weight ratio of 40/30/15/15 was added 1.0% by weight, based on pulp, of sodium hydroxide, and the mixture was adjusted to a pulp consistency of 15% by weight with water and then disintegrated at 40° C. for 6 min using a pulper to prepare raw material C. Raw material C was adjusted to a desired consistency and then treated in a cavitation jet washer in the same manner as described in Example 1 at a jetting liquid pressure (upstream pressure) of 7 MPa (jet flow rate 70 m/sec.) and a pressure in the target vessel (downstream pressure) of 0.3 MPa for varying periods to modulate the freeness. The resulting fractions were measured for Canadian Standard Freeness and the treated pulp was thoroughly washed on a 150-mesh wire. The washed pulp was prepared into handsheets in the same manner as described in Example 1 and tested for similar items, and the results are shown in Tables 7 and 8. Clark stiffness was also measured by the method described below, and the results are shown in Table 7.

Clark stiffness: measured according to JIS P 8143: 1996.

Comparative Examples 11-16

Raw material C was beaten in a PFI mill in the same manner as described in Comparative example 1 for varying numbers of counts to modulate the freeness. The beaten pulp and handsheets prepared therefrom were tested for similar items to those of Example 5, and the results are shown in Tables 7 and 8. Raw material C was further kneaded in a laboratory double-arm kneader for varying runs to modulate the freeness. The treated pulp and handsheets prepared therefrom were tested for similar items to those of Example 5, and the results are shown in Tables 7 and 8.

TABLE 7

|  |  | Treatment conditions | CSF (ml) | Basis weight (g/m²) | Density (g/m³) | Bulk (cm³/g) | Breaking length (km) | Elongation (%) | Tear index (mN·m²/g) | Clark stiffness |
|---|---|---|---|---|---|---|---|---|---|---|
| Examples | 9 | 2 min | 158 | 54.5 | 0.486 | 2.06 | 3.14 | 1.8 | 7.28 | 34.7 |
|  | 10 | 5 min | 139 | 55.1 | 0.479 | 2.09 | 3.35 | 1.9 | 8.10 | 28.1 |
|  | 11 | 10 min | 96 | 54.5 | 0.463 | 2.16 | 2.95 | 1.8 | 7.55 | 28.5 |
| Comparative examples | 11 | Untreated | 260 | 53..3 | 0.453 | 2.21 | 2.52 | 1.8 | 7.94 | 17.1 |
|  | 12 | 2 runs | 205 | 55.2 | 0.534 | 1.87 |  |  |  |  |
|  | 13 | 3 runs | 154 | 56.7 | 0.536 | 1.87 | 3.83 | 1.9 | 5.13 | 25.2 |
|  | 14 | 1000 counts | 158 | 60.1 | 0.520 | 1.92 | 3.89 | 2.3 | 5.40 | 35.3 |
|  | 15 | 3000 counts | 130 | 58.3 | 0.526 | 1.90 |  |  |  |  |
|  | 16 | 5000 counts | 98 | 57.9 | 0.523 | 1.91 |  |  |  |  |

TABLE 8

|  |  | Brightness (%) | Opacity (%) | Specific scattering coefficient (m²/kg) | Specific absorption coefficient (m²/kg) |
|---|---|---|---|---|---|
| Examples | 9 | 62.2 | 84.7 | 32.1 | 2.39 |
|  | 10 | 63..0 | 85.0 | 33.1 | 2.29 |
|  | 11 | 64.0 | 82.0 | 31.0 | 1.85 |
| Comparative examples | 11 | 60.8 | 85.6 | 32.2 | 2.84 |
|  | 12 | 60.4 | 82.1 | 27.6 | 2.28 |
|  | 13 | 60.3 | 83.1 | 28.0 | 2.30 |
|  | 14 | 61.0 | 86.1 | 29.9 | 2.46 |
|  | 15 | 60.9 | 83.9 | 28.5 | 2.25 |
|  | 16 | 60.6 | 84.1 | 28.3 | 2.39 |

As shown in Table 7, the examples showed very low densities and high bulks as compared with the comparative examples at approximately equal freenesses. They also showed improved paper strength as compared with the untreated control (Comparative example 11) and improved tear index as compared with Comparative examples 12-16. Clark stiffness also increased, thereby giving high stiffness to sheets.

As shown in Table 8, brightness increased in the examples as compared with the untreated control (Comparative example 11) and mechanically treated samples (Comparative examples 12-16). It is generally known that mechanical beating/kneading in the presence of ink in the production of recycled pulp results in the so-called ink penetration phenomenon in which small particles of ink penetrate into lumens or pores of fibers whereby brightness decreases. In the examples, freeness decreased without ink penetration, as proved by increased brightness. Thus, it is shown that the present invention provides a method for beating pulp wherein bulk loss is reduced without ink penetration.

Examples 12-15

To a waste paper mixture consisting of toner prints, waste coated magazine paper, no carbon copying paper and heat-sensitive paper in a weight ratio of 40/40/10/10 was added 1.0% by weight, based on pulp, of sodium hydroxide, and the mixture was adjusted to a pulp consistency of 15% by weight with water and then disintegrated at 40° C. for 6 min using a pulper to prepare raw material D. Raw material D was adjusted to a desired consistency by adding water, and then treated in a cavitation jet washer in the same manner as described in Example 1 at a jetting liquid pressure (upstream pressure) of 7 MPa (jet flow rate 70 m/sec.) and a pressure in the target vessel (downstream pressure) of 0.3 MPa for varying periods to modulate the freeness. A part of the resulting pulp was thoroughly washed on a 150-mesh wire, and the washed pulp was prepared into handsheets in the same manner as described in Example 1 and tested for similar items, and the results are shown in Tables 9 and 10.

Comparative Examples 17-21

Raw material D was beaten in a PFI mill in the same manner as described in Comparative example 1 for varying numbers of counts to modulate the freeness. The beaten pulp and handsheets prepared therefrom were tested for similar items to those of Example 12, and the results are shown in Tables 9 and 10.

TABLE 9

|  |  | Treatment conditions | CSF (ml) | Basis weight (g/m²) | Density (g/m³) | Bulk (cm³/g) | Breaking length (km) | Elongation (%) | Tear index (mN·m²/g) |
|---|---|---|---|---|---|---|---|---|---|
| Examples | 12 | 2 min | 191 | 58.1 | 0.546 | 1.83 | 4.0 | 2.4 | 7.8 |
|  | 13 | 5 min | 159 | 61.8 | 0.550 | 1.82 | 4.1 | 2.6 | 7.8 |
|  | 14 | 10 min | 133 | 61.8 | 0.554 | 1.80 | 4.2 | 2.7 | 8.0 |
|  | 15 | 15 min | 80 | 59.6 | 0.555 | 1.80 | 4.6 | 2.7 | 8.6 |
| Comparative examples | 17 | Untreated | 329 | 61.3 | 0.545 | 1.84 | 3.6 | 2.5 | 7.7 |
|  | 18 | 1000 counts | 212 | 58.7 | 0.543 | 1.84 | 3.9 | 2.5 | 7.2 |
|  | 19 | 2000 counts | 196 | 59.1 | 0.556 | 1.80 | 4.4 | 3.0 | 7.9 |
|  | 20 | 3000 counts | 178 | 63.2 | 0.574 | 1.74 | 4.5 | 2.8 | 8.9 |
|  | 21 | 5000 counts | 158 | 59.8 | 0.570 | 1.75 | 4.4 | 3.0 | 8.4 |

TABLE 10

|  | | Brightness (%) | Opacity (%) | Specific scattering coefficient (m²/kg) | Specific absorption coefficient (m²/kg) |
|---|---|---|---|---|---|
| Examples | 12 | 76.5 | 82.5 | 35.8 | 0.8 |
|  | 13 | 77.7 | 83.5 | 36.1 | 0.9 |
|  | 14 | 78.8 | 82.5 | 36.6 | 1.0 |
|  | 15 | 79.0 | 81.3 | 35.8 | 1.1 |
| Comparative examples | 17 | 73.0 | 86.2 | 35.9 | 1.6 |
|  | 18 | 73.7 | 84.6 | 35.7 | 1.5 |
|  | 19 | 72.6 | 84.7 | 35.1 | 1.5 |
|  | 20 | 72.1 | 85.8 | 34.2 | 1.5 |
|  | 21 | 69.8 | 85.9 | 34.5 | 1.8 |

As shown in Table 9, the examples showed lower densities and higher bulks as compared with the comparative examples at approximately equal freenesses. Paper strength was nearly comparable between the examples and comparative examples at the same freeness, and both breaking length and tear index were improved in the examples as compared with the comparative examples at the same density.

As shown in Table 10, brightness remarkably increased by cavitation and further increased with the decrease in freeness in the examples. This was attributed to promoted ink stripping from fibers. However, brightness decreased with the decrease in freeness by PFI mill treatment in the comparative examples, suggesting that ink penetration proceeded.

Thus, it can be said that the present invention provides a method for beating pulp wherein bulk loss is reduced and paper strength is improved with little or without ink penetration.

Examples 16-18

Raw material E consisting of finished recycled newspaper pulp was adjusted to a pulp consistency of 3.6% by weight, and then treated in a cavitation jet washer in the same manner as described in Example 1 at a jetting liquid pressure (upstream pressure) of 7 MPa (jet flow rate 60 m/sec.) and a pressure in the target vessel (downstream pressure) of 0.1 MPa for varying periods to modulate the freeness. The resulting pulp was measured for Canadian Standard Freeness as well as fiber length and curl by FiberLab (from Metso Automation, Inc.), and the results are shown in Table 11. Then, handsheets were prepared in the same manner as described in Example 1 and tested for similar items, and the results are shown in Table 12. Smoothness and gas permeation resistance were also measured by an Oken's smoothness and gas permeability tester according to Japan TAAPI Paper and Pulp Test Method No. 5-2: 2000, and the results are shown in Table 12. Dirt on the handsheets were detected by an image analyzer (trade name: Spec Scan 2000 from Apogee Technology, Inc.) to determine the total areas of fractions of dirt having a diameter exceeding 100 μm and dirt having a diameter exceeding 250 μm, and the results are shown in Table 11.

Pure bending resistance: measured by a pure bending tester (trade name: JTC-911BT from SMT Co., Ltd.) on a test piece cut into 10 cm×10 cm.

Comparative Example 22

Raw material E was tested for similar items to those of Example 16, and the results are shown in Table 11. Then, handsheets were prepared in the same manner as described in Example 1 and tested for similar items to those of Example 16, and the results are shown in Table 12.

TABLE 11

|  | Treatment conditions | CSF (ml) | Fiber length (mm) | Curl (%) | Dirt area (mm²/m²) | |
|---|---|---|---|---|---|---|
|  |  |  |  |  | >φ100 μm | >φ250 μm |
| Example 19 | 2 min | 194 | 0.87 | 16.1 | 99 | 13 |
| Example 20 | 6 min | 166 | 0.88 | 16.2 | 54 | 5 |
| Example 21 | 10 min | 147 | 0.89 | 16.1 | 56 | 8 |
| Comparative example 23 | Untreated | 230 | 0.89 | 17.5 | 110 | 14 |

TABLE 12

|  | Basis weight (g/m²) | Density (g/m³) | Breaking length (km) | Burst index (kPa·m²/g) | Pure bending resistance (μN·m²/m) | Smoothness (sec) | Gas permeation resistance (sec) | Brightness (%) | Opacity (%) | Specific scattering coefficient (m²/kg) |
|---|---|---|---|---|---|---|---|---|---|---|
| Example 19 | 58.9 | 0.568 | 5.3 | 3.2 | 110 | 99 | 56 | 78.5 | 81.2 | 37.2 |
| Example 20 | 58.9 | 0.584 | 5.6 | 3.2 | 107 | 109 | 71 | 78.2 | 80.4 | 35.7 |
| Example 21 | 56.7 | 0.583 | 5.6 | 3.5 | 106 | 121 | 78 | 78.3 | 79.3 | 35.4 |
| Comparative example 23 | 59.7 | 0.551 | 4.6 | 2.8 | 111 | 69 | 27 | 78.3 | 82.5 | 38.3 |

As shown in Table 11, the dirt areas decreased despite less damage to pulp fibers as proved by a decrease in fiber fragmentation and no increase in curl in the examples occurred as compared with the untreated control (Comparative example 22). As shown in Table 12, the examples showed improvements in strength as well as pure bending resistance, smoothness, and gas permeation resistance as compared with the untreated control (Comparative example 22).

Examples 19-21

Raw material F consisting of finished recycled woodfree paper pulp was adjusted to a pulp consistency of 2.1% by weight, and then treated in a cavitation jet washer in the same manner as described in Example 1 at a jetting liquid pressure (upstream pressure) of 7 MPa (jet flow rate 60 m/sec.) and a pressure in the target vessel (downstream pressure) of 0.1 MPa for varying periods to modulate the freeness. The resulting pulp was measured for Canadian Standard Freeness as well as fiber length and curl by FiberLab (from Metso Automation, Inc.), and the results are shown in Table 13. Then, handsheets were prepared in the same manner as described in Example 1 and tested for similar items, and the results are shown in Table 14. Smoothness and gas permeation resistance were also measured by an Oken's smoothness and gas permeability tester according to Japan TAAPI Paper and Pulp Test Method No. 5-2: 2000, and the results are shown in Table 14. Dirt on the handsheets were detected by an image analyzer (trade name: Spec Scan 2000 from Apogee Technology, Inc.) to determine the total areas of fractions of dirt having a diameter exceeding 100 μm and dirt having a diameter exceeding 250 μm, and the results are shown in Table 13.

Comparative Example 23

Raw material F was tested for similar items to those of Example 19, and the results are shown in Table 13. Then, handsheets were prepared in the same manner as described in Example 1 and tested for similar items to those of Example 19, and the results are shown in Table 14.

TABLE 13

| | Treatment conditions | CSF (ml) | Fiber length (mm) | Curl (%) | Dirt area (mm²/m²) | |
|---|---|---|---|---|---|---|
| | | | | | >φ100 μm | >φ250 μm |
| Example 16 | 2 min | 254 | 0.80 | 19.5 | 110 | 20 |
| Example 17 | 6 min | 226 | 0.81 | 19.2 | 74 | 10 |
| Example 18 | 10 min | 210 | 0.82 | 19.2 | 70 | 7 |
| Comparative example 22 | Untreated | 325 | 0.77 | 21.2 | 120 | 22 |

TABLE 14

| | Basis weight (g/m²) | Density (g/m³) | Breaking length (km) | Burst index (kPa·m²/g) | Pure bending resistance (μN·m²/m) | Smoothness (sec) | Gas permeation resistance (sec) | Brightness (%) | Opacity (%) | Specific scattering coefficient (m²/kg) |
|---|---|---|---|---|---|---|---|---|---|---|
| Example 16 | 58.7 | 0.595 | 4.5 | 2.9 | 96 | 77 | 17 | 82.4 | 82.3 | 38.5 |
| Example 17 | 59.9 | 0.608 | 4.8 | 2.9 | 103 | 87 | 25 | 82.3 | 82.3 | 37.6 |
| Example 18 | 58.5 | 0.608 | 5.1 | 3.4 | 98 | 93 | 27 | 82.1 | 81.8 | 37.4 |
| Comparative example 22 | 59.2 | 0.576 | 3.5 | 2.2 | 92 | 54 | 8 | 83.0 | 83.7 | 41.1 |

As shown in Table 13, the dirt areas decreased despite less damage to pulp fibers as proved by a decrease in fiber fragmentation and no increase in curl in the examples occurred as compared with the untreated control (Comparative example 23). As shown in Table 12, the examples showed improvements in strength as well as pure bending resistance, smoothness, and gas permeation resistance as compared with the untreated control (Comparative example 23).

Examples 23-25

Raw material G consisting of thermomechanical pulp (a blend of *Picea jezoensis*, *Abies sachalinensis* and *Pinus radiata*) having undergone secondary refining by a practical factory machine was cleaned by a screen and a cleaner (freeness 132 ml CSF) and adjusted to a pulp consistency of 2.6% by weight, and then treated in a cavitation jet washer in the same manner as described in Example 1 at a jetting liquid pressure (upstream pressure) of 7 MPa (jet flow rate 70 m/sec.) and a pressure in the target vessel (downstream pressure) of 0.1 MPa for varying periods to modulate the freeness. The resulting pulp was measured for Canadian Standard Freeness as well as fiber length and curl by FiberLab (from Metso Automation, Inc.), and the results are shown in Table 15. The number of shives was measured by PQM1000 (from Metso Automation, Inc.) for each of the various shives (width 75 μm or more, length 0.3 mm or more), wide shives (width 150 μm or more, length 0.3 mm or more), and long shives (width 75 μm or more, length 1.5 mm or more), and shown as the number per gram of pulp in Table 15. Then, handsheets were prepared in the same manner as described in Example 1 and tested for similar items, and the results are shown in Table 16 and 17.

Comparative Example 24

Raw material G was tested for similar items to those of Example 23, and the results are shown in Table 15. Then, handsheets were prepared in the same manner as described in Example 1 and tested for similar items to those of 23, and the results are shown in Table 16 and 17.

Comparative Example 25

Raw material G was adjusted to a pulp consistency of 3.5% by weight, and then treated in a double disc refiner (DDR) and tested for similar items to those of Example 23, and the results are shown in Table 15. Then, handsheets were prepared in the same manner as described in Example 1 and tested for similar items to those of Example 23, and the results are shown in Table 16 and 17.

TABLE 15

| | Treatment conditions | CSF (ml) | Number of shives (number/g) | | | Fiber length (mm) |
|---|---|---|---|---|---|---|
| | | | Wide shives | Long shives | Total shives | |
| Example 22 | 2 min | 105 | 159 | 44 | 800 | 1.26 |
| Example 23 | 6 min | 98 | 170 | 59 | 768 | 1.21 |
| Example 24 | 10 min | 91 | 133 | 36 | 705 | 1.15 |
| Example 25 | 14 min | 89 | 138 | 31 | 703 | 1.23 |
| Comparative example 24 | Untreated | 132 | 223 | 88 | 1006 | 1.22 |
| Comparative example 25 | DDR | 108 | 206 | 59 | 926 | 1.17 |

TABLE 16

| | Basis weight (g/m²) | Density (g/m³) | Breaking length (km) | Elongation (%) | Tear index (mN·m²/g) | Burst index (kPa·m²/g) | Pure bending resistance (μN·m²/m) |
|---|---|---|---|---|---|---|---|
| Example 22 | 60.7 | 0.405 | 3.83 | 1.68 | 7.18 | 1.82 | 220.3 |
| Example 23 | 59.7 | 0.403 | 3.85 | 1.70 | 7.03 | 1.76 | 225.6 |
| Example 24 | 58.1 | 0.412 | 3.99 | 1.73 | 6.88 | 1.80 | 195.9 |

TABLE 16-continued

|  | Basis weight (g/m$^2$) | Density (g/m$^3$) | Breaking length (km) | Elongation (%) | Tear index (mN·m$^2$/g) | Burst index (kPa·m$^2$/g) | Pure bending resistance (μN·m$^2$/m) |
|---|---|---|---|---|---|---|---|
| Example 25 | 58.6 | 0.412 | 3.93 | 1.68 | 7.02 | 1.75 | 209.1 |
| Comparative example 24 | 58.8 | 0.383 | 3.60 | 1.65 | 6.89 | 1.64 | 200.1 |
| Comparative example 25 | 58.4 | 0.397 | 3.64 | 1.58 | 5.80 | 1.70 | 196.1 |

TABLE 17

|  | Smoothness (sec) | Gas permeation resistance (sec) | Brightness (%) | Opacity (%) | Specific scattering coefficient (m$^2$/kg) |
|---|---|---|---|---|---|
| Example 22 | 53 | 100 | 58.2 | 95.6 | 61.3 |
| Example 23 | 61 | 112 | 58.5 | 95.4 | 61.9 |
| Example 24 | 73 | 120 | 58.1 | 95.0 | 60.9 |
| Example 25 | 70 | 120 | 58.2 | 95.3 | 62.4 |
| Comparative example 24 | 44 | 70 | 58.3 | 95.4 | 60.2 |
| Comparative example 25 | 60 | 93 | 58.9 | 94.9 | 62.4 |

As shown in Table 15, the number of shives in the examples decreased as compared with the untreated control (Comparative example 24). The number of shives in the examples also decreased as compared with DDR treatment (Comparative example 25) despite less damage to pulp fibers as proved by a decrease in fiber fragmentation and no increase in curl. As shown in Table 16, the examples showed improvements in strength and pure bending resistance as compared with the untreated control (Comparative example 24) and DDR treatment (Comparative example 25). As shown in Table 17, smoothness and gas permeation resistance were also improved.

Examples of the Second Invention

Experiment about Ink Stripping

Examples 26-27

Figure 1:
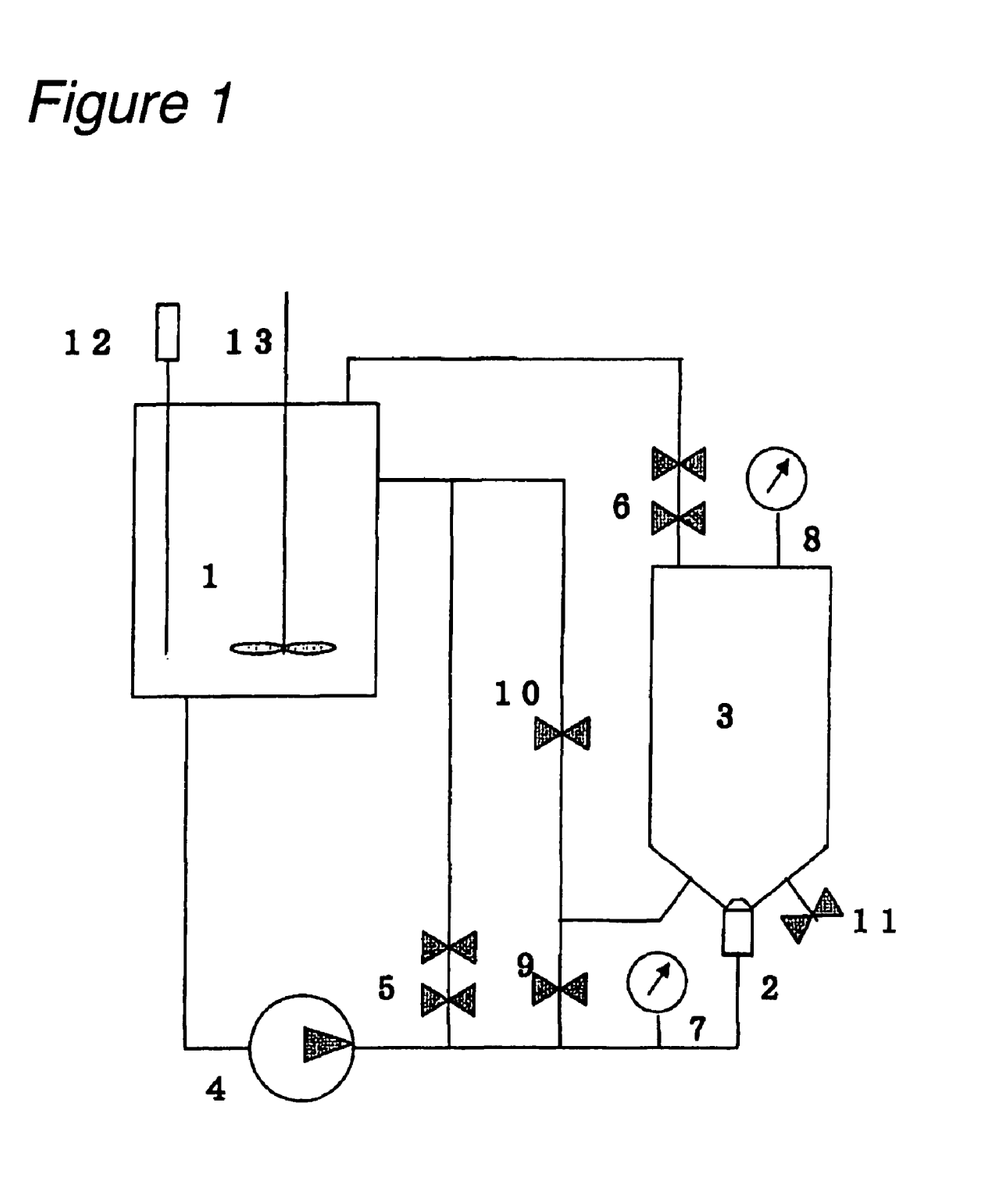
FIG. 1 is a schematic diagram showing the cavitation jet washer used in the examples.

Froth from factory A and a model white water (drain water obtained by disintegrating a coated paper in a low consistency pulper followed by filtration through a 80-mesh filter cloth in a laboratory) were treated in a cavitation jet washer (nozzle diameter 1.5 mm) shown in FIG. 1 at a jetting liquid pressure (upstream pressure) of 7 MPa (jet flow rate 70 m/sec.) and a pressure in the target vessel (downstream pressure) of 0.3 MPa for 15 minutes. The treated froth and model white water were treated in a laboratory floatation cell to reach the same reject rate. Five handsheets of 60 g/m$^2$ were prepared for each sample before and after flotation according to the Tappi standard method. Coarse grained ink on the handsheets was determined by detecting dirt having a particle diameter of 100 μm or more on the five different handsheets by image processing using a dirt analyzer (Spec Scan 2000 from Apogee Technology, Inc.). The results are shown in Table 18.

Comparative Examples 26-27

Froth from factory A and a model white water were treated in a laboratory floatation cell to the same reject rate without being treated in a cavitation jet washer. Samples before and after flotation were tested for coarse grained ink in the same manner. The results are shown in Table 18.

TABLE 18

|  |  | Number of dirt (>100 μm) (number/m$^2$) | | Dirt removal rate (%) | Average particle size (mm$^2$/m$^2$) | |
|---|---|---|---|---|---|---|
|  |  | Before floatation | After floatation | After floatation | Before floatation | After floatation |
| Example 26 | Froth from factory A | 19,000 | 3,300 | 82.6 | 0.0064 | 0.0061 |
| Example 27 | Model white water | 480,000 | 27,000 | 94.4 | 0.0092 | 0.0026 |
| Comparative example 26 | Froth from factory A | 16,000 | 9,600 | 40.0 | 0.0091 | 0.0056 |
| Comparative example 27 | Model white water | 260,000 | 140,000 | 46.2 | 0.0443 | 0.0086 |

As shown in Table 18, the dirt particles in Examples 26 and 27 have smaller average particle sizes before flotation than those of Comparative examples 26 and 27, indicating that they have been fragmented. Moreover, the number of dirt particles after flotation in Examples 26 and 27 significantly decreased as compared with the number of dirt particles in the corresponding comparative examples, showing that the dirt removal rates were remarkably improved. Thus, it can be said that stripping and fragmentation of dirt from pulp fibers and/or ash were promoted in the examples, whereby dirt can be easily removed by flotation.

Experiment about Ink Removal 1

Examples 28-30

Froth from factory B was treated in a cavitation jet washer at an upstream pressure of 7 MPa and a downstream pressure of 0.3 MPa for 10 minutes. The treated froth was treated in a laboratory floatation cell for varying periods to reach varying reject rates. The samples exiting the floatation cell were tested for brightness according to the method of JIS P 8148 using a colorimeter (from Murakami Color Research Laboratory Co., Ltd.). Residual ink was also evaluated by determining fine grained ink as ERIC (effective residual ink concentration) value using a residual ink analyzer (Color Touch: from Technidyne Corporation) to calculate brightness gain and ink removal rate. The results are shown in Table 19 and FIG. 2.

Comparative Examples 28-30

Froth from factory B was treated in a laboratory floatation cell for varying periods to reach varying reject rates without being treated in a cavitation jet washer. The samples exiting the floatation cell were measured for brightness and fine grained ink in the same manner to calculate brightness gain and ink removal rate. The results are shown in Table 19 and FIG. 2.

TABLE 19

|  | Reject rate (%) | Ink removal rate (%) | Brightness gain |
| --- | --- | --- | --- |
| Example 28 | 23.7 | 30.6 | 2.2 |
| Example 29 | 41.1 | 57.2 | 9.4 |
| Example 30 | 77.8 | 78.8 | 12.6 |
| Comparative example 28 | 29.6 | 23.5 | 1.5 |
| Comparative example 29 | 34.0 | 23.2 | 3.1 |
| Comparative example 30 | 50.2 | 41.2 | 6.3 |

Figure 2:
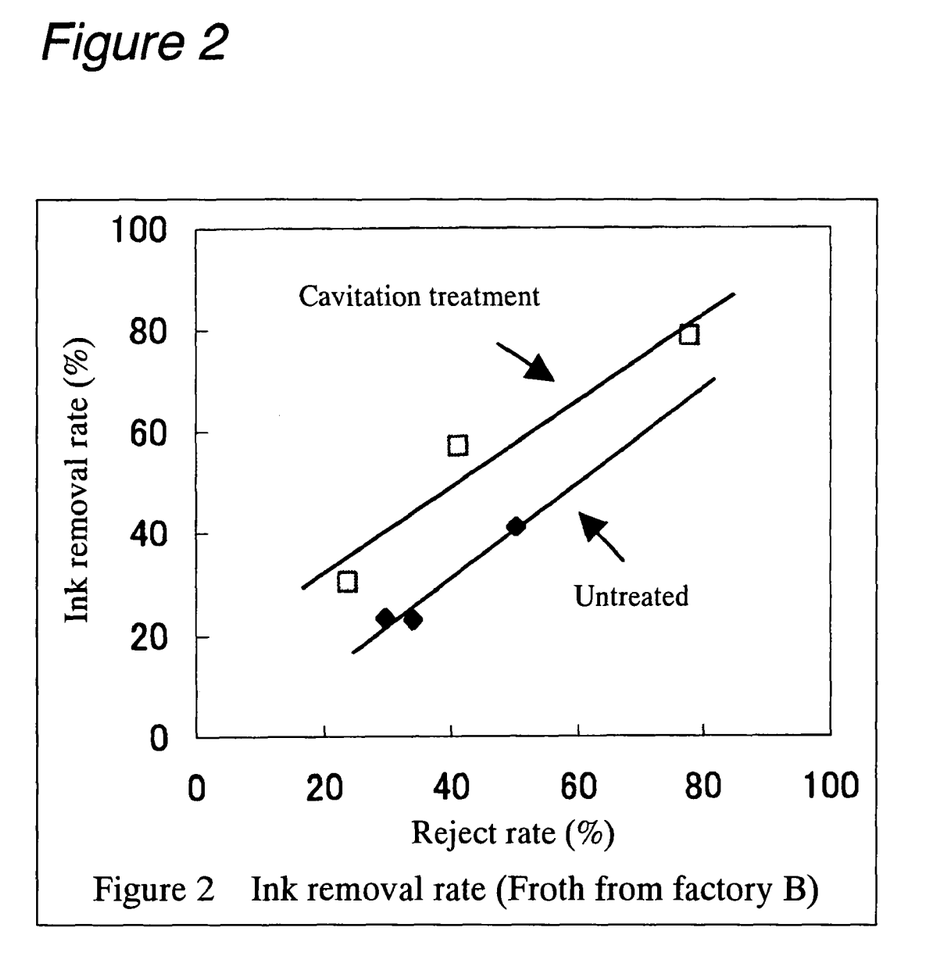
FIG. 2 is a graph showing the relationship between the ink removal rate and the reject rate in froth from factory B.

As shown in Table 19 and FIG. 2, the ink removal rates in Examples 28-30 (cavitation treatment in FIG. 2) remarkably increased as compared with Comparative examples 28-30 (untreated in FIG. 2) at equal reject rates. Brightness gain also increased.

Experiment on Ink Removal 2

Examples 31-33

White water from factory B was treated in the same manner as described in Examples 28-30. The treated samples were measured for brightness and fine grained ink in the same manner to calculate brightness gain and ink removal rate. The results are shown in Table 20 and FIG. 3.

Comparative Examples 31-33

White water from factory B was treated in the same manner as described in Comparative examples 28-30. The treated samples were measured for brightness and fine grained ink in the same manner to calculate brightness gain and ink removal rate. The results are shown in Table 20 and FIG. 3.

TABLE 20

|  | Reject rate (%) | Ink removal rate (%) | Brightness gain |
| --- | --- | --- | --- |
| Example 31 | 25.9 | 36.9 | 4.1 |
| Example 32 | 35.0 | 55.1 | 6.4 |
| Example 33 | 44.8 | 68.9 | 8.1 |
| Comparative example 31 | 32.6 | 21.3 | 2.1 |
| Comparative example 32 | 44.9 | 34.6 | 3.3 |
| Comparative example 33 | 47.8 | 38.2 | 3.4 |

Figure 3:
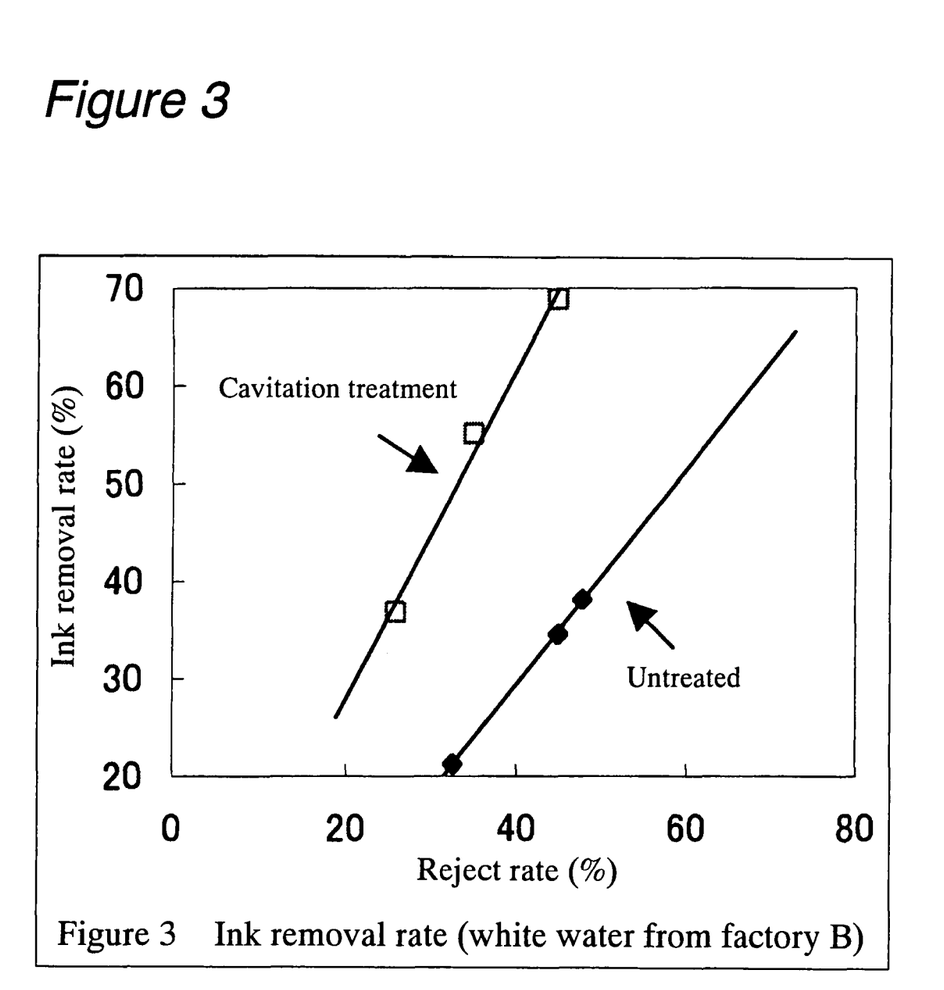
FIG. 3 is a graph showing the relationship between the ink removal rate and the reject rate in white water from factory B.

As shown in Table 20 and FIG. 3, the ink removal rates in Examples 31-33 (cavitation treatment in FIG. 3) remarkably increased as compared with Comparative examples 31-33 (untreated in FIG. 3) at equal reject rate, and brightness gain increased.

Experiment about Adhesion

Examples 34-35

Froth from factory A and froth from factory B were treated in a cavitation jet washer at an upstream pressure of 7 MPa and a downstream pressure of 0.3 MPa for 15 and 10 minutes, respectively. Five 10 cm square polystyrene films were placed in the treated froths, which were then slowly stirred for 10 minutes. After 10 minutes, the films were removed and dried, and then weighed to calculate the difference between the weights before and after stirring and report it as polystyrene deposit.

Comparative Examples 34-35

The polystyrene deposit was determined for froth from factory A and froth from factory B without treating them in a cavitation jet washer.

TABLE 21

|  | Polystyrene deposit (g/m$^2$) |
| --- | --- |
| Example 34 | 369 |
| Example 35 | 98 |
| Comparative example 34 | 950 |
| Comparative example 35 | 150 |

As shown in Table 21, the polystyrene deposits in Examples 34 and 35 significantly decreased as compared with Comparative examples 34 and 35 corresponding to them. It seemed that adhesion of fine adhesive materials decreased in the examples because adhesive materials generally tend to adhere to hydrophobic surfaces such as polystyrene.

Experiments about Decrease of Microorganisms

Example 36

Froth from factory B was treated in a cavitation jet washer at an upstream pressure of 7 MPa and a downstream pressure of 0.3 MPa for 10 minutes. An aliquot of the treated froth was placed in a vessel and stored in the dark at room temperature.

The propagation of microorganisms was weekly observed visually and evaluated as ratings 1 to 4.

Comparative Example 36

An aliquot of froth from factory B was placed in a vessel and stored in the dark at room temperature without being treated in a cavitation jet washer. The propagation of microorganisms was evaluated in the same manner.

TABLE 22

|  | After 0 week | After 1 week | After 2 weeks | After 3 weeks |
| --- | --- | --- | --- | --- |
| Example 36 | 1 | 1 | 2 | 3 |
| Comparative example 36 | 1 | 3 | 4 | 4 |

Generally, raw materials containing deinked pulp and raw materials for papermaking processes are perishable and liable to microbial propagation because they contain much organic materials such as starch. As shown in Table 22, fungi or the like propagate or the liquid becomes rotten obviously slowly in Example 36 as compared with Comparative example 36, probably because microorganisms were killed by the treatment in the example.

Experiments about Catalase

Example 37

Froth from factory B was treated in a cavitation cell at an upstream pressure of 7 MPa and a downstream pressure of 0.3 MPa for 10 minutes. A 50-ml aliquot of the treated froth was placed in a beaker and stirred along with hydrogen peroxide for 35 minutes, after which the residual hydrogen peroxide content was determined.

Comparative Example 37

The residual hydrogen peroxide content in froth from factory B was evaluated in the same manner without treating it in a cavitation cell.

TABLE 23

|  | Reaction period (min) | Residual hydrogen peroxide content (%) |
| --- | --- | --- |
| Example 37 | 35 | 80.1 |
| Comparative example 37 | 35 | 75.7 |

Some species of microorganisms are known to excrete catalase having the ability to decompose hydrogen peroxide, and the bleaching efficiency will decrease if microorganisms producing catalase propagate in process. This results from hydrolysis of hydrogen peroxide. The proportion of hydrogen peroxide remaining in Example 37 increased as compared with Comparative example 37. Thus, it seemed that the bleaching efficiency loss caused by microorganisms and/or inhibitors derived from microorganisms can be reduced.

The invention claimed is:

1. A method for beating pulp in a process for producing pulp, which comprises: generating cavitation in a pulp suspension by emitting a fluid jet via a nozzle or an orifice tube, wherein an upstream pressure of the nozzle or the orifice tube is 2 MPa or more and 30 MPa or less, and a ratio between a downstream pressure and the upstream pressure of the nozzle or the orifice tube is in the range of 0.001-0.5, and wherein a jet flow rate of the fluid jet is in the range of 20 m/sec or more and 100 m/sec or less.

2. The method for beating pulp of claim 1 wherein said process for producing pulp comprises a pulping step and a blending step.

3. The method for beating pulp of claim 1 wherein the pulp suspension is emitted as the fluid jet.

4. A method for beating pulp of claim 1 wherein the target pulp is a softwood or hardwood kraft pulp.

5. A method for beating pulp of claim 1 wherein the target pulp is a softwood or hardwood mechanical pulp.

6. The method for beating pulp of claim 1 wherein the target pulp is a recycled pulp derived from waste paper.

* * * * *